April 24, 1928.                    E. GOLDBERG ET AL                    1,667,110
                                        FILM BOX
                                    Filed Oct. 7, 1926
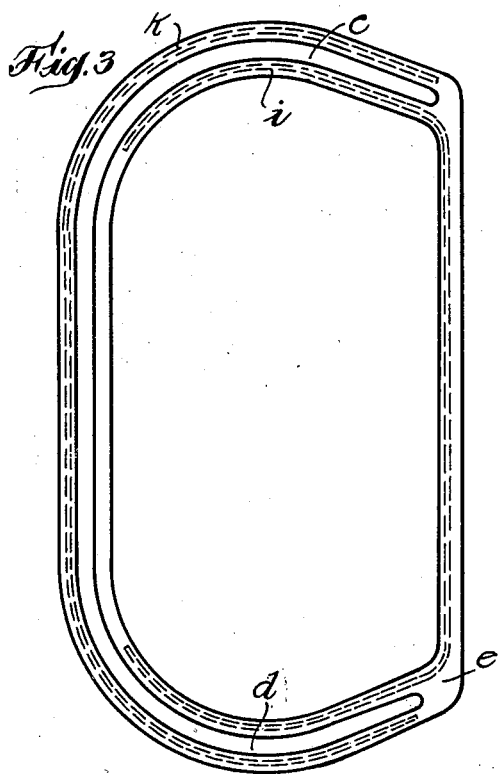
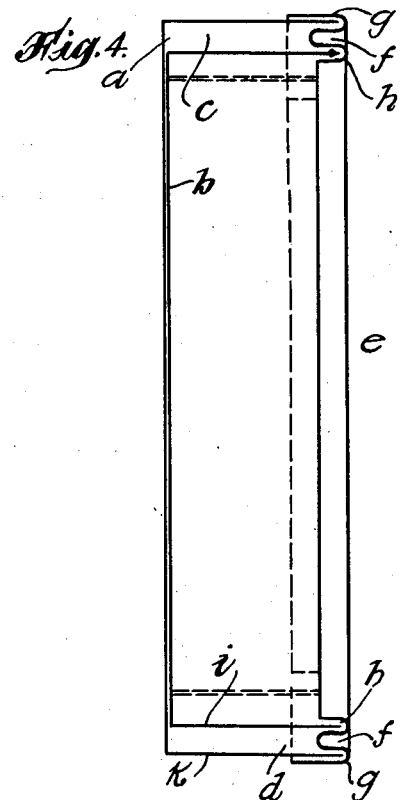
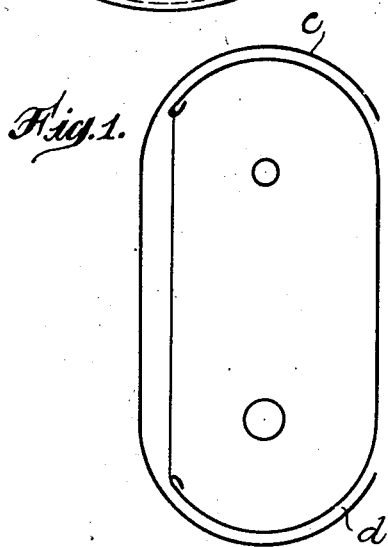
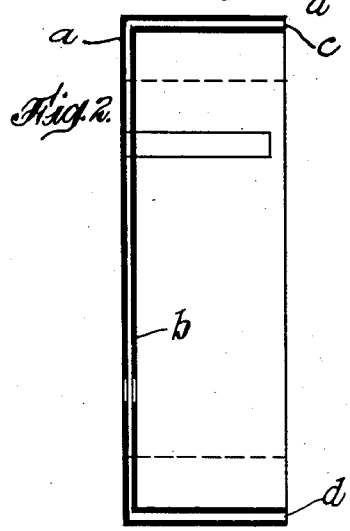
Inventors:
Emanuel Goldberg
Martin Nawicki
By their Attorney
George C. Heinize Patented Apr. 24, 1928.

1,667,110

UNITED STATES PATENT OFFICE.

EMANUEL GOLDBERG AND MARTIN NOWICKI, OF DRESDEN, GERMANY, ASSIGNORS TO THE FIRM: ZEISS-JKON, AKTIENGESELLSCHAFT, OF DRESDEN, GERMANY.

FILM BOX.

Application filed October 7, 1926, Serial No. 140,015, and in Germany October 8, 1925.

This invention relates to improvements in film roll holders or magazines, for holding flexible films, particularly for photographic or cinematographic apparatus, and it is the principal object of our invention to provide a simple and inexpensive magazine in which the film will be protected against light rays in a space formed between the two walls of two concentric receptacles, one placed into the other, and united at their bottom parts, while a cover for the opposite open side of the magazine has its inner face formed with a suitable rib or ridge adapted to engage between the two walls of the receptacles, the ends of which engage the grooves formed to both sides of the ridge, between the same and the cover flanges, so that the cover will hold the two walls forming the film channels at the proper distance apart.

These and other objects of our invention will become more fully known as the description thereof proceeds, and will then be specifically defined in the appended claim.

In the accompanying drawings forming a material part of this disclosure:

Figure 1 is a diagrammatic top plan view of a film magazine constructed according to our invention.

Figure 2 is a sectional side elevation thereof with the cover omitted.

Figure 3 is a top plan with cover in place of the magazine on an enlarged scale.

Figure 4 is a view, similar to Figure 2, with the cover in place. As illustrated, the film magazine constructed according to our invention comprises two boxes $a$ and $b$ which are placed one within the other in such manner that their bottom parts engage, and are united in any well known manner. As the inner box $b$ is of a considerably smaller size than the outer box $a$, film channels $c$, $d$, are formed between the walls thereof and the open tops of both receptacles are closed by a cover $e$ which has on its inner face formed a rib or ridge $f$ extending into the channels $c$ and $d$, and the ends of the channel forming walls $i$ and $k$ engage the grooves formed between the ridge $f$ and the outer and inner flanges of the cover, as clearly illustrated in Figure 4.

The operation of our improved film-box or magazine will be entirely clear from the above description, and it is to be understood, that we may protect the film by any well known means while it is drawn out of the magazine, and may make such changes in the specific construction and arrangement shown, as come within the scope of the appended claims without departure from the spirit of our invention, and the principle involved.

Having thus described our invention, what we claim as new, and desire to secure by Letters Patent is:—

The claim—

In a film magazine of the class described including two boxes one placed within the other with their side walls in spaced relation to form film channels, and united at their bottom parts, and a common cover for the open top parts of both boxes, an inner projecting central rib on said cover, and outer flanges parallel to said rib to form grooves therewith for the reception of the ends of the side walls of both boxes to brace the same and holding these ends apart.

In witness whereof we have hereunto set our hands.

EMANUEL GOLDBERG.
MARTIN NOWICKI.